United States Patent [19]

Miyazaki et al.

[11] Patent Number: 5,484,563
[45] Date of Patent: Jan. 16, 1996

[54] INJECTION MOLDING PROCESS USING A RESIN RESERVOIR CONTAINING A RETRACTABLE PISTON

[75] Inventors: Hirotaka Miyazaki, Shizuoka; Hiromitsu Sakai, Aichi; Tsuneyoshi Okada, Kanagawa, all of Japan

[73] Assignee: Polyplastics Co., Ltd., Osaka, Japan

[21] Appl. No.: 396,863

[22] Filed: Mar. 1, 1995

Related U.S. Application Data

[63] Continuation of Ser. No. 68,923, May 28, 1993, abandoned.

[30] Foreign Application Priority Data

Jun. 5, 1992 [JP] Japan .................... 4-145791

[51] Int. Cl.[6] .......................... B29C 45/00; B29C 45/03
[52] U.S. Cl. ............. 264/69; 264/328.7; 264/328.12; 264/328.18; 425/425; 425/542
[58] Field of Search ................... 264/69, 328.12, 264/328.7, 328.18; 425/425, 542

[56] References Cited

U.S. PATENT DOCUMENTS

| | | | |
|---|---|---|---|
| 2,191,703 | 2/1940 | Anderson | 18/42 |
| 4,399,093 | 8/1983 | Kirby et al. | 264/328.2 |
| 4,540,534 | 9/1985 | Grendol | 264/328.12 |
| 4,563,324 | 1/1986 | Kubát et al. | |
| 4,925,161 | 5/1990 | Allan et al. | 264/69 |
| 4,960,557 | 10/1990 | Sorensen | 264/328.12 |
| 5,069,840 | 12/1991 | Arnott | 264/69 |
| 5,090,886 | 2/1992 | Jaroschek | 425/130 |
| 5,225,136 | 7/1993 | Furugohri et al. | 264/328.8 |
| 5,260,012 | 11/1993 | Arnott | 264/69 |

FOREIGN PATENT DOCUMENTS

| | | |
|---|---|---|
| 0362648 | 10/1988 | European Pat. Off. . |
| 0508732 | 10/1992 | European Pat. Off. . |
| 48-71459 | 9/1973 | Japan . |
| 57-22031 | 2/1982 | Japan . |
| 2202414 | 8/1990 | Japan . |
| 2008023 | 5/1979 | United Kingdom ............ 264/69 |
| WO8000814 | 5/1980 | WIPO . |

OTHER PUBLICATIONS

JP-A 01267015 Jan. 19, 1990 Patent Abstracts of Japan vol. 14, No. 29.

*Primary Examiner*—Karen Aftergut
*Attorney, Agent, or Firm*—Depaoli & Frenkel

[57] ABSTRACT

An injection molding process includes using a mold provided with a resin reservoir having a retractable piston and protruding from a mold cavity in at least one of divided resin passages ranging from the point where the injected molten resin is divided into two streams to a weld formed by the union of the resin streams, feeding the molten resin into the mold while the piston is in a retracted or advanced state to form the weld, and either advancing the piston toward the mold cavity side to force the resin from the resin reservoir into the cavity or retracting the piston to withdraw the resin from the cavity side into the resin reservoir so as to cause the migration of the resin in the weld to thereby force the resin on one side of the weld into the resin on the other side, thus reinforcing the weld, and which is capable of remarkably improving the strength of the weld and its periphery of a molding which otherwise forms a weld having an extremely low strength.

6 Claims, 3 Drawing Sheets

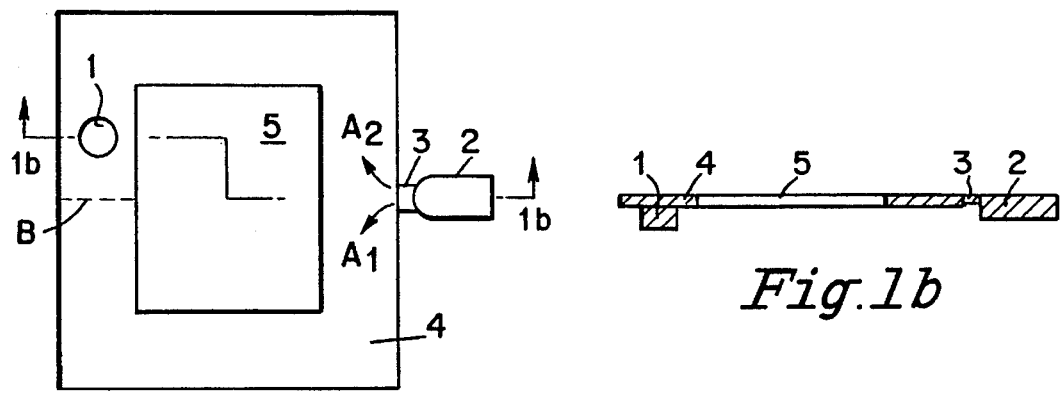
*Fig.1a*
*Fig.1b*
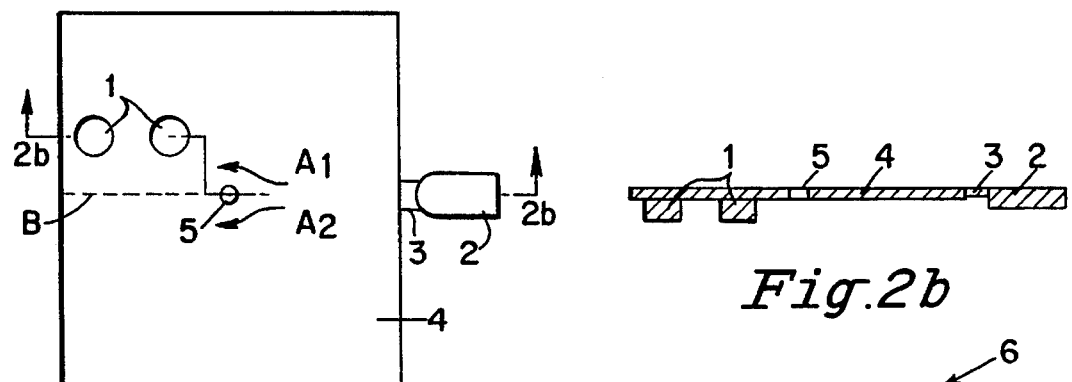
*Fig.2a*
*Fig.2b*
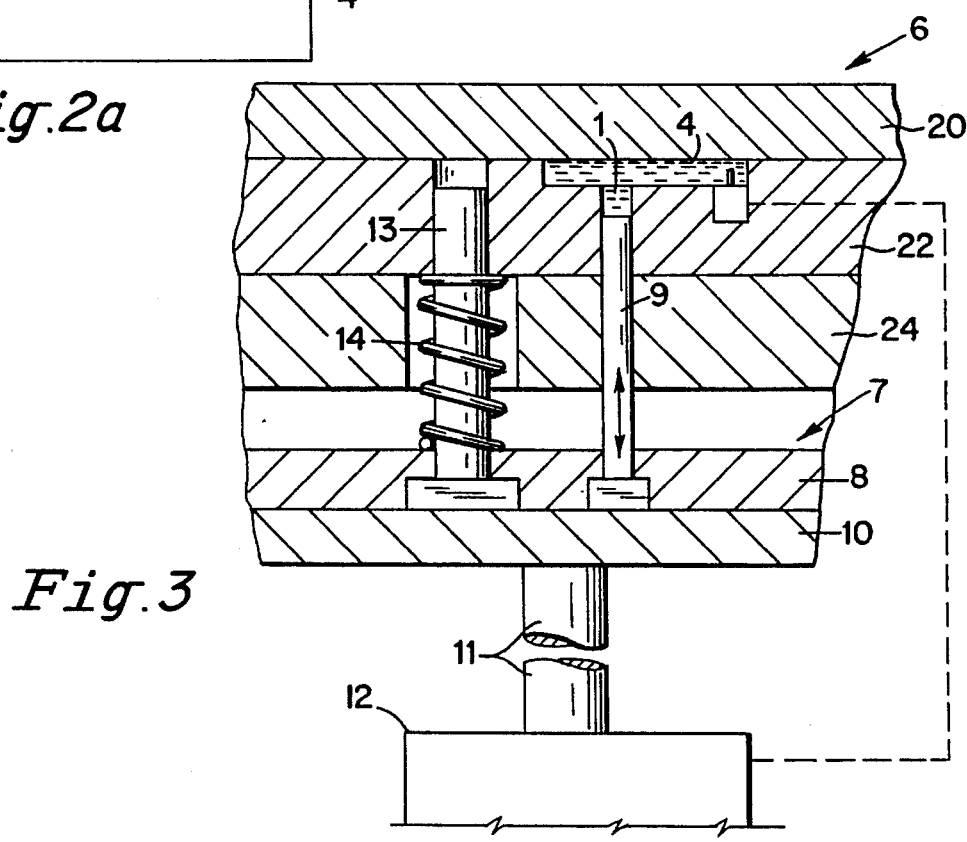
*Fig.3*

INJECTION MOLDING PROCESS USING A RESIN RESERVOIR CONTAINING A RETRACTABLE PISTON

This application is a continuation of U.S. application Ser. No. 08/068,923, filed May 28, 1993 now abandoned.

FIELD OF THE INVENTION

The present invention relates to an injection molding process for molding a thermoplastic resin, a mold for injection molding and an injection-molded article. More particularly, the present invention is concerned with an injection molding process capable of remarkably improving the strength of a weld and periphery thereof in a molding which process otherwise forms a weld having an extremely low strength, a mold for use in such an injection molding process and an injection-molded article having improved weld strength, etc.

DESCRIPTION OF THE RELATED ART

In injection molding, when the injected resin is divided into streams by a core or the like provided in a mold cavity, a weld is formed in the region where the divided resin streams are united. Also, when a desired article has non-uniform thicknesses, the injected molten resin flows at rates which are different between the regions of varying thickness such that a division of the resin into streams is likely to occur, thereby forming a weld in the region where the divided resin streams are united. Since a weld is likely to occur by a combination of the various factors mentioned above, it is extremely difficult to obtain a molding which has a complicated configuration as required for practicable moldings and is free from welds. Welds not only degrade the appearance of a molding due to the occurrence of a streaky pattern known as a "weld mark" thereat, but also cause a serious problem in that the strength of a molding is much lower than the strength inherently possessed by the resin largely because the divided resin streams are merely united at the weld by fusion and unification thereof without effecting any uniform mixing of the resin streams.

For coping with the above-mentioned problem of lowered strength at welds, a molding process has been proposed in Japanese Patent Publication-A No. 71459/1973, in which a resin is injected into a mold having a resin reservoir provided at positions where a weld occurs and the resin introduced into the resin reservoir is forced back into the mold to improve the strength of the welds. Further, in Japanese Patent Publication-A No. 202414/1990, another molding process has been proposed, in which a resin is injected into a mold through a plurality of gates each provided with a valve so that a plurality of the produced resin streams are united to form welds and thereafter the valve is operated so as to cause a pressure difference between the resin streams in an attempt to disturb the welds and accordingly improve the strength of the welds.

However, in the former process (Japanese Patent Publication-A No. 71459/1973), it is difficult to disturb the orientation of the resin and filler at the welds by producing; satisfactory resin streams at the welds, so that the strength of the welds cannot be satisfactorily improved. On the other hand, in the latter process (Japanese Patent Publication-A No. 202414/1990), the structures of the mold and the apparatus are extremely complicated, so that not only are apparatus costs unfavorably high, but also control of the valve for obtaining the advantageous effects is difficult.

SUMMARY OF THE INVENTION

The present invention is directed to a process for effectively improving weld strength or the like by causing the migration of the resin at the welds while the resin maintains its flowability in the mold cavity after the formation of welds so as to disturb the orientation of the resin and filler at the welds, as well as a mold for use in such a process.

According to the present invention, there is provided an injection molding process for a thermoplastic resin, characterized by using a mold provided with a resin reservoir having a retractable piston and wherein the reservoir protrudes from a mold cavity in at least one of divided region passages ranging from the point where the injected molten resin is divided into two streams to a weld formed by the union of the resin streams. The process comprises feeding the molten resin into the mold while the piston is in a retracted or advanced state to form the weld, and either advancing the piston toward the mold cavity side to force the resin from the resin reservoir into the cavity or retracting the piston to withdraw the resin from the cavity side into the resin reservoir so as to cause the migration of the resin in the weld to thereby force the resin on one side of the weld into the resin on the other side, thus reinforcing the weld. Also, according to the present invention, there are provided a mold for injection-molding a thermoplastic resin which is suitable for use in the injection molding process of the present invention, and a molding produced by the injection molding process of the present invention.

BRIEF DESCRIPTION OF THE DRAWINGS

FIG. 1 is a view of a type of mold which forms a weld, and in which a resin reservoir has been provided according to the present invention, wherein 1a is a schematic plan view and 1b is a schematic view of a section along line 1b—1b in 1a.

FIG. 2 is a view of an alternative mold which forms a weld, and in which a resin reservoir has been provided according to the present invention, wherein 2a is a schematic plan view and 2b is a schematic view of a section along line 2b—2b in 2a.

FIG. 3 is a schematic view of a section around the resin reservoir in FIG. 1a and shows one form of a piston for forcing the resin from the resin reservoir into the mold cavity or for withdrawing the resin from the cavity into the resin reservoir as well as operating parts thereof.

FIG. 4 is a schematic plan view showing the initial condition of injected resin in the mold cavity and resin reservoir in the mold of FIG. 1 in a process wherein the resin is to be forced from the resin reservoir into the mold cavity, and wherein 4a is a schematic plan view and 4b is a schematic view of a section along line 4a—4a in FIG. 4a.

FIG. 5b is a schematic view of a section along line 5a—5a in FIG. 5a.

FIG. 6b is a schematic view of a section along line 6a—6a.

FIG. 7b is a schematic view of a section along line 7a—7a in FIG. 7a.

DETAILED DESCRIPTION OF THE INVENTION

Figure 4A:
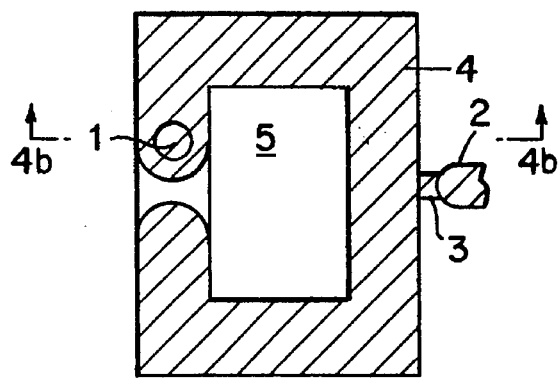

Now, referring to the attached drawings, the mold and injection molding process of the present invention will be described.

FIGS. 1a and 2a each show one mode of the molds according to the present invention which are improved over the conventional molds wherein welds B are formed in the produced moldings having increased weld strength. The improved molds include a reservoir 1 protruding from a mold cavity 4 in a preselected position, i.e., in at least one of divided resin passages ranging from the point where the injected molten resin is divided into two streams $A_1$ and $A_2$ to a weld B formed by the union of the resin streams. FIGS. 1b and 2b show the distribution of resin in mold cavity 4 and reservoir 1 in the respective molds shown in FIGS. 1a and 2a. The resin reservoir 1 is provided with a retractable piston 9, shown in FIG. 3, for either forcing the resin from the resin reservoir 1 into the mold cavity 4 or withdrawing the resin from the cavity side into the resin reservoir 1. In practicable molds (moldings), such simple configurations are rare, and the way in which the molten resin is injected into the mold cavity and the process of the formation of welds are complicated. However, fundamentally, the description made herein and set out below applies to any mold structure and injection molding process.

In the molding of a shaped article using a mold such as shown in either FIGS. 1a or 2a, provided with a resin reservoir 1, the molten resin is injected through gate 2 and runner 3 into mold cavity 4. The injected molten resin is divided into two streams $A_1$ and $A_2$ in front of a core 5, and a weld is formed at a point B where the resin streams are united. In this weld, there is a drawback since the fronts of the two divided resin streams $A_1$ and $A_2$ merely abut each other as if they were closely adhered to each other. Not only the resin but also the filler contained in the resin is oriented across the weld without undergoing uniform mixing, so that the strength of the weld is poor.

In the molding process using a mold of FIG. 1a or FIG. 2a provided with a resin reservoir 1 having a retractable piston in a preselected position according to the present invention, one of the following procedures is employed to disturb the orientation of the resin and the filler at the weld so that the strength of the weld is improved. In one procedure, the molten resin is fed into the mold cavity 4 while the piston 9 is in a retracted state and the molten resin is divided into two streams $A_1$ and $A_2$, which are united at a point B to form a weld. Thereafter, the piston is advanced toward the mold cavity side to force the resin from the resin reservoir 1 into the cavity 4 so as to cause a pressure difference between two sides of the weld to thereby force the resin on one side provided with resin reservoir 1 into the resin on the side of weld B which is not provided with a resin reservoir. In the other procedure, the molten resin is fed into the mold cavity 4 while the piston 9 is in an advanced state and the molten resin is divided into streams which are united to form a weld B. Thereafter, the piston is retracted to withdraw the resin from the mold cavity 4 into the resin reservoir 1 so as to cause a pressure difference between two sides of the weld to thereby force the resin on the one side of weld B not provided with a resin reservoir into the resin on the other side of weld B provided with resin reservoir 1. The movement of the piston 9 for forcing the resin from the resin reservoir 1 into the cavity 4 or for withdrawing the resin from the cavity 4 into the resin reservoir 1 is preferably conducted while the piston 9 is vibrated. This vibration is preferably conducted at a cycle of 10 Hz or below.

In the above molding process, a system may be adopted in which a sensor capable of detecting the condition of resin filling the cavity 4 is provided in the mold or on a molding machine side and a hydraulic pressure device or the like is actuated in accordance with detection signal from the sensor to move the piston 9 for forcing the resin from the resin reservoir 1 into the cavity 4 or for withdrawing the resin from the cavity 4 into the resin reservoir 1. Such a system is shown schematically in FIG. 3. Alternatively, a system may be adopted in which the time required for forming a weld is previously measured and the piston is moved after a predetermined time by a pressure device or the like.

FIG. 3 shows one example of the mold structure according to the present invention. In this structure, mold cavity 4 and reservoir 1 are provided in mold body 22 which is provided with a mold cover 20. Forcing of the resin from the resin reservoir 1 into the cavity 4 and withdrawal of the resin from the cavity 4 into the resin reservoir 1 are carried out by a pin-shaped piston 9. The advance of the piston 9 is performed by a local pressuring device 12 provided with vibration means (not shown). The retraction of piston 9 is performed by a forced retraction spring 14 placed around return pin 13 and abuts mold body 22. The local pressuring device 12 provided with vibration means is mounted on a movable platen (not shown), and is capable of vibrating and pressing a pressure plate 10 via a pressure rod 11. The retraction of the pressure plate 10 is also performed by spring 14 disposed in the mold to force pressure plate 10 toward the movable platen. The operational control for vibration timing, vibration frequency and vibration time is performed by the local pressuring device 12. Movable components comprising pressure plate 10 and support plate 8 for guiding return pin 13 and piston 9 form movable mold 7. Mold body 22 including cover 20 and guide plate 24 for guiding spring 14, return pin 13 and piston 9 are part of fixed mold 6.

By the use of the mold of this invention, it is feasible to control both a process in which the molten resin is injected while retracting pin-shaped piston 9 by means of a forced retraction spring 14 so as to form a weld and then a vibrational force is applied by the local pressuring device 12 through pressure rod 11 to pressure plate 10 and conveyed to pin-shaped piston 9 so that the piston 9 is advanced to force the resin from the resin reservoir 1 into the cavity 4, and a process in which the molten resin is injected into the mold cavity 4 while the pin-shaped piston 9 is in an advanced state via pressure rod 11 and pressure plate 10, directed by local pressuring device 12 so as to form a weld and then the operation of the local pressuring device 12 is discontinued, followed by retraction of the pin-shaped piston 9 by means of forced retraction spring 14, to thereby withdraw the resin from the cavity 4 into the resin reservoir 1.

Figure 5A:
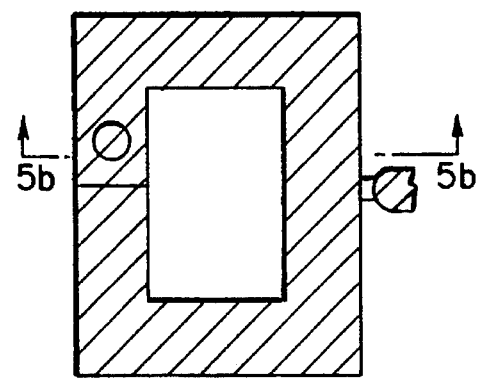
FIG. 5a is a schematic plan view showing the continuing condition of injected resin in the mold of FIG. 1 in a process wherein the resin is forced from the resin reservoir into the mold cavity.
Figure 4B:
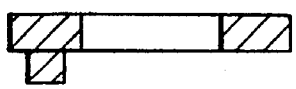
Figure 5B:
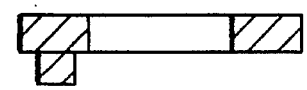
Figure 6A:
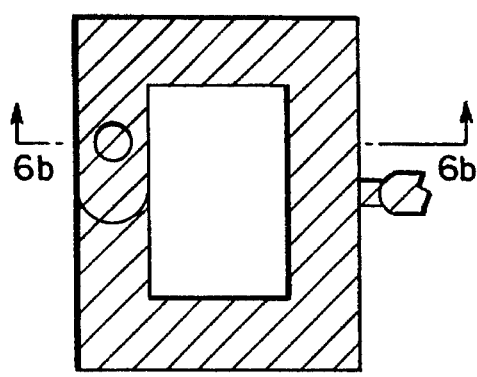
FIG. 6a is a schematic plan view showing the continuing condition of injected resin in the mold of FIG. 1 wherein the resin is forced from the resin reservoir into the mold cavity.
Figure 7A:
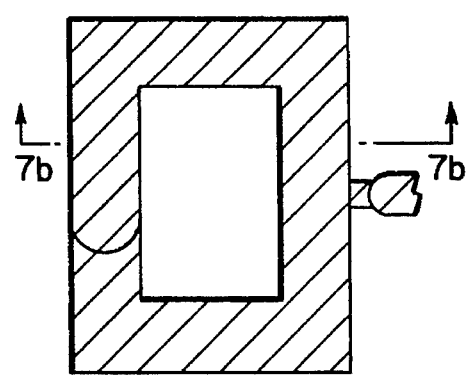
FIG. 7a is a schematic plan view showing the final condition of injected resin in the mold of FIG. 1 wherein the resin is forced from the resin reservoir into the mold cavity.
Figure 6B:
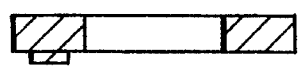
Figure 7B:
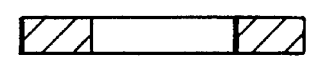
Figure 8A:
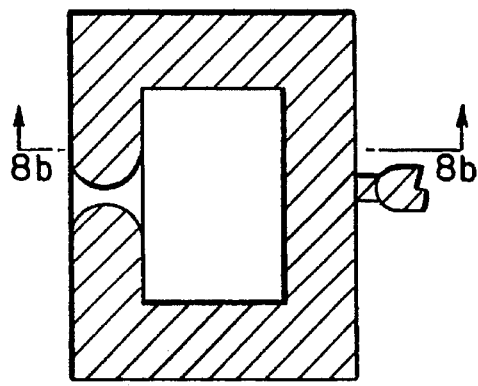
FIG. 8a is a schematic plan view showing the initial condition of injected resin in the mold of FIG. 1 wherein the resin is to be withdrawn from the mold cavity.
Figure 9A:
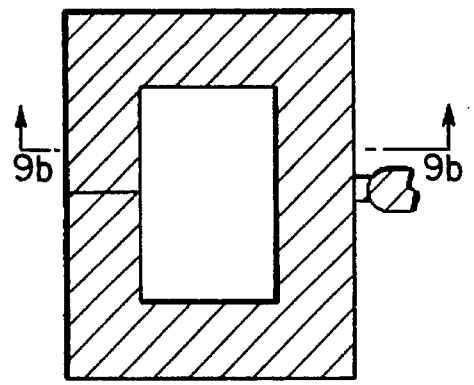
FIG. 9a is a schematic plan view showing the continuing condition of injected resin in the mold of FIG. 1 wherein the resin is withdrawn from the mold cavity.
Figure 8B:
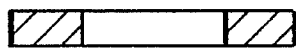
FIG. 8b is a schematic view of a section along line 8a—8a in FIG. 8a into the resin reservoir.
Figure 9B:
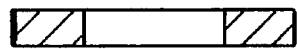
FIG. 9b is a schematic view of a section along line 9a—9a in FIG. 9a into the resin reservoir.
Figure 10A:
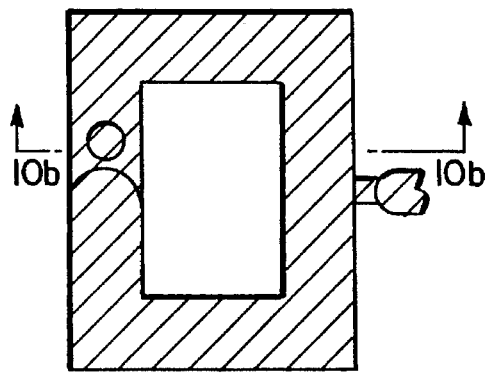
FIG. 10a is a schematic plan view showing the continuing condition of injected resin in the mold of FIG. 1 wherein the resin is withdrawn from the mold cavity.
Figure 11A:
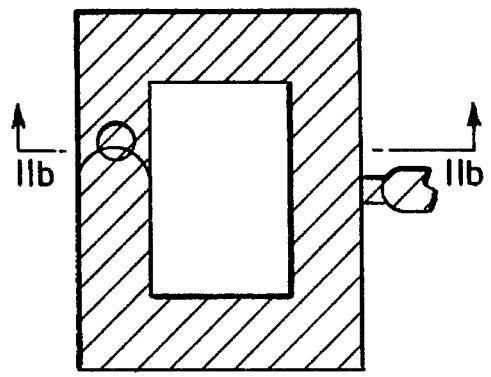
FIG. 11a is a schematic plan view showing the final condition of injected resin in the mold of FIG. 1 wherein the resin is withdrawn from the mold cavity.
Figure 10B:
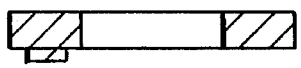
FIG. 10b is a schematic view of a section along line 10a—10a in FIG. 10a into the resin reservoir.
Figure 11B:
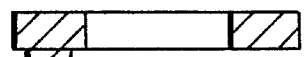
FIG. 11b is a schematic view of a section along line 11a–11a in FIG. 11a into the resin reservoir.

With respect to the timing for forcing the resin from the resin reservoir 1 into the cavity 4 or for withdrawing the resin from the cavity 4 into the resin reservoir 1, it maybe performed even several seconds after the formation of the weld, as long as the molten resin maintains its flowability to such an extent that the resin in the resin reservoir 1 can be forced into the cavity 4 or the resin in the cavity 4 is flowable into the resin reservoir 1. However, it is preferably performed immediately after the formation of the weld, because the amount of the forced or withdrawn resin is largely due to the high flowability of the resin, so that the improvement of the strength of the weld is promoted. FIGS. 4 to 7 schematically show the change with time of the condition of injected resin in the case where the resin is forced from the resin reservoir 1 into the cavity 4. On the other hand, FIGS. 8 to 11 schematically show the change with time of the condition of injected resin in the case where the resin is withdrawn from the cavity 4 into the resin reservoir 1.

In the mold according to the present invention, a plurality of resin reservoirs may be provided as shown in FIG. 2a and 2b. A plurality of resin reservoirs may be provided in both of the divided resin passages $A_1$ and $A_2$ although complicated forcing and withdrawal of the resin is required. It is generally preferred that the resin reservoirs be provided in only one of the divided passages along the weld.

In the mold according to the present invention, the position and volume of the resin reservoir depends on the solidification rate of the resin, the volume of the molding as well as molding conditions, such as resin temperature, mold temperature and injection pressure, and hence cannot be specified irrespective of these factors. However, it is apparent that when the resin reservoir is positioned too far apart from the weld or when the resin reservoir is disposed in a position such that part of the resin reservoir overlaps the weld position, the amount of the resin forced from one side of the weld into the other side of the weld is decreased, thereby diminishing the effect of improving the weld. It is needless to say that if a resin reservoir is provided at the weld position to force the resin from the resin reservoir into the cavity or; to withdraw the resin from the cavity into the resin reservoir, the effect of improving the strength of the weld due to the forcing of the resin from one side of the weld into the other side of the weld cannot be attained. Therefore, generally, a desirable position of the resin reservoir is at a distance of 1 to 10 mm from the weld.

The resin reservoir preferably has a capacity of at least $\frac{1}{3} \times L \times S$ (mm$^3$), still preferably at least $1 \times L \times S$ (mm$^3$), wherein L represents the distance (mm) from the weld to the resin reservoir and S represents the sectional areas (mm$^2$) of the molding along the weld. It is preferred that the capacity of the resin reservoir be not greater than 10% of the volume of the molding.

The injection molding process and mold according to the present invention are applicable to injection molding any conventional thermoplastic resin. In particular, however, the molding process and mold are effectively applied to those resins from which moldings produced by the conventional injection molding processes inevitably have extremely poor weld strength. For example, moldings of crystalline resins, especially liquid crystalline polymers, produced by the conventional processes have extremely poor strength at welds as compared with the strength of other portions of the molding due to the orientation of the molecules on both sides of the weld, along the weld. However, when such crystalline resins are molded by the injection molding process and the mold according to the present invention, the above-mentioned orientation at the weld is effectively disturbed, so that the strength of the weld is satisfactorily improved.

Further, a molding of thermoplastic resin compounded with an inorganic filler, especially a fibrous filler, is likely to have the same problem of poor weld strength due to the orientation of the inorganic filler, especially the fibrous filler along the weld. However, the injection molding process and the mold according to the present invention are applicable with extreme advantage to a molding of such filler-compounded resins as well.

As apparent from the foregoing description, in the injection molding of a thermoplastic resin to obtain a molding which otherwise forms a weld having an extremely low strength, the injection molding process and the mould according to the present invention are highly advantageous in that the orientation of the resin and the filler at the weld is disturbed so that the weld is effectively reinforced in the resultant molding, and hence have high practical value. More specifically, the advantage is brought about by using a mold provided, in a preselected position, with a resin reservoir whose capacity can be changed by the advance and retraction of a piston by means of a local pressuring device or the like. The migration of the resin along one side of the weld into the resin on the other side of the weld can be caused either by advancing the piston toward the mold cavity by means of the local pressuring device so as to force the resin from the resin reservoir into the mold cavity after formation of the weld by feeding molten resin into the mold cavity, or by previously advancing the piston by means of the local pressuring device and then, after the formation of the weld by feeding molten resin into the mold cavity, retracting the piston to withdraw the resin from the mold cavity into the resin reservoir.

EXAMPLES

Hereinbelow, the present invention will be described in greater detail with reference to the following Examples, which should not be construed as to limit the scope of the present invention.

Examples 1–2 and Comparative Example 1

A polyphenylene sulfide resin compounded with 40% by weight of glass fiber (GF) was injection molded using a mold for injection molding which had the configuration of FIG. 1(a) and was provided with control means for the resin reservoir as shown in FIG. 3.

The characteristics of major portions of the employed mold and molding conditions were as follows:
  dimension around molding weld: 10 mm in width×1 mm in thickness,
  dimension of resin reservoir: 5 mm in diameter×3 mm in height,
  molding conditions: holding pressure of 500 kgf/cm$^2$, conditions for forcing the resin from the resin reservoir into the cavity: forcing pressure of 710 kgf/cm², the forcing being initiated immediately after complete filling of the cavity, and conditions for withdrawing the resin from the cavity into the resin reservoir: the capacity of the resin reservoir being zero at the time of filling of the cavity, the withdrawal being initiated immediately after complete filling of the cavity.

For comparison, injection molding was performed using a mold having no resin reservoir.

The tensile strength was measured for each of the obtained moldings, and the results are shown in Table 1.

Examples 3–4 and Comparative Example 2

Moldings were produced in substantially the same manner as in Examples 1–2 and Comparative Example 1, except that use was made of a liquid crystal polymer compounded with 30% by weight of glass fiber, and the flexural strength of each of the moldings was measured. The results are shown in Table 2.

TABLE 1

|  | Ex. 1 | Ex. 2 | Comp. Ex. 1 |
| --- | --- | --- | --- |
|  | resin forced into the cavity | resin withdrawn from the cavity | without resin reservoir |
| Tensile strength (kgf/cm²) | 1600 | 1450 | 950 |

TABLE 2

|  | Ex. 3 resin forced into the cavity | Ex. 4 resin withdrawn from the cavity | Comp. Ex. 2 without resin reservoir |
| --- | --- | --- | --- |
| Flexural strength (kgf/cm²) | 1840 | 1680 | 450 |

What we claim is:

1. An injection molding process for making a molded article having increased tensile strength due to a reinforced weld, comprising providing a mold provided with a resin reservoir having a retractable piston and protruding from a mold cavity in at least one of divided resin passages ranging from a point where injected molten resin is divided into two streams to a weld formed by union of the two resin streams, feeding the molten resin into the mold while the piston is in a retracted state or an advanced state to form the weld, and after filling the mold with the injected molten resin, then either advancing, with vibration, the piston toward the mold cavity side to force the resin from the resin reservoir into the mold cavity or retracting, with vibration, the piston to withdraw the resin from the mold cavity side into the resin reservoir, so as to cause migration of the resin in the weld to thereby force the resin on one side of the weld into the resin on another side, thus reinforcing the weld thereby increasing the tensile strength of the injection molded article due to the vibration of the piston during either the advancing or the retracting of the piston.

2. An injection molding process according to claim 1, wherein the vibration is conducted at a cycle of from greater than 0 Hz up to 10 Hz.

3. An injection molding process according to claim 1, wherein the resin reservoir has a capacity of at least ⅓×L×S (mm³) wherein L represents a distance (mm) from the weld to the resin reservoir and S(mm²) represents a sectional area of molding formed along the weld.

4. An injection molding process according to claim 1, wherein the injected molten resin is a crystalline thermoplastic resin.

5. An injection molding process according to claim 1, wherein the injected molten resin is one containing an inorganic filler.

6. An injection molding process according to claim 1, wherein the injected molten resin is a liquid crystalline polymer.

* * * * *